United States Patent Office 3,492,305
Patented Jan. 27, 1970

3,492,305
NON-CATALYTIC PREPARATION OF PYRIDINES
John Edward Colchester, Runcorn, England, assignor to Imperial Chemical Industries Limited, London, England, a corporation of Great Britain
No Drawing. Filed Sept. 3, 1965, Ser. No. 485,066
Claims priority, application Great Britain, June 3, 1965, 23,740/65
Int. Cl. C07d 31/02, 31/04
U.S. Cl. 260—290     5 Claims

ABSTRACT OF THE DISCLOSURE

There is provided a process for preparing pyridine wherein substituted or unsubstituted glutaraldehydes and precursors thereof are reacted in the liquid phase in the presence of molecular oxygen and in the absense of any catalyst. An alkanoic acid preferably having up to 6 carbon atoms in the alkyl group may be included in the reaction medium. Conveniently the reaction temperature is up to 150° C. and the partial pressure of oxygen is at least 0.5 atmosphere.

---

This invention relates to the manufacture of organic bases, and in particular to a process for the manufacture of pyridine or substituted pyridines.

According to the present invention there is provided a process for the manufacture of pyridine or substituted pyridines which comprises interacting glutaraldehyde, a substituted glutaraldehyde or a precursor thereof in the liquid phase with ammonium ions or ammonia in the absence of cupric ions and of ferric ions and of any catalyst and in the presence of molecular oxygen.

By the term "precursor" is denoted a compound which, in the absence of ammonium ions, will give rise to a glutaraldehyde when subjected to the conditions of temperature and pH contemplated for use in the reaction. Such precursors may be, for example, the cyclic enol-acetals of the said aldehydes. The cyclic enol-acetals are alternateively described as ethers of 2-hydroxy-3,4-dihydro-2H-pyrans. In particular, the alkyl ethers (2-alkoxy-3,4-dihydro-2H-pyrans) may be used, for example the alkyl ethers containing up to 6 carbon atoms in the alkoxy group.

It is preferred to carry out the reaction under conditions such that the ammonia is present predominantly as an ammonium salt rather than as free ammonia; the pH range from 1 to 7 is especially preferred.

Ammonium ions may be introduced as such or may be generated in situ. It is preferred to introduce ammonium ions in the form of ammonium salt; suitable ammonium salts include the salts of aliphatic carboxylic acids, for example ammonium acetate, and the salts of mineral acids, for example ammonium sulphate and ammonium nitrate. Alternatively, gaseous ammonia or a solution of ammonia may be introduced into the reaction mixture. Amides hydrolysable to form ammonium ions, for example formamide or urea, may also be employed.

It is preferred to use at least one mole of ammonium ion or ammonia for each mole of glutaraldehyde, substituted glutaraldehyde or precursor thereof. The concentration of ammonium ions of preferably at least 0.01 molar, for example in the range of 0.01 to 2.0 molar.

The reaction medium may comprise water and/or an organic solvent, mixtures of water with one or more organic components are especially suitable. A wide range of organic solvents may be used but it is preferred to use an alkanoic acid containing up to 6 carbon atoms in the alkyl group, for example acetic acid or propionic acid. It is especially preferred to use aqueous acetic containing, for example, from 2% to 50% by weight of acetic acid.

When an ammonium salt is employed in the reaction, the acidity of the reaction mixture may be derived from the ammonium salt but additional acid may be present, conveniently the acid corresponding to the ammonium salt employed. Thus in a preferred embodiment of the invention, aqueous acetic acid is used as the reaction medium and ammonium acetate is the source of ammonium ions.

The reaction may be carried out over a wide range of temperature and pressure, depending partly upon the particular reactants and reaction medium. In general, it is preferred to use temperatures in the range from 15° C. to 150° C., especially in the range from 80° C. to 130° C.

Preferably, the reaction is carried out at a pressure in the range from 1 to 30 atmospheres, for example in the range from 1 to 20 atmospheres; higher pressures, for example up to 50 atmospheres, may also be employed.

The partial pressure of oxygen is preferably in the range from 0.1 to 20 atmospheres; it is especially preferred to use an oxygen partial pressure of at least 0.5 atmosphere, for example about 1 atmosphere. The oxygen may be introduced as substantially pure oxygen or in the form of a mixture, for example a mixture of oxygen and nitrogen.

The reaction may be carried out batch-wise but it is an advantage of the process described herein that it lends itself to continuous operation.

In order to operate the process continuously it is highly desirable that the product should exist in the mixture in the form of a free base rather than as a salt and, to this end, the pH preferably lies within the range 4 to 7. The free pyridine or substituted pyridine may then be separated from the reaction mixture continuously, for example by azeotropic distillation or solvent extraction.

If it is desired to carry out the reaction batch-wise it is practicable to operate in a pH range (for example from pH 1 to pH 4) in which the product is obtained initially as a salt of the base with an anion which is present in the mixture. The base may then be released by adjusting the pH, for example by adding an alkali, and the pyridine or substituted pyridine may then be separated by conventional methods.

The process is applicable, in particular, to the manufacture of pyridine itself and of alkylpyridines, for example methylpyridines. It will be apparent, however, that the process is applicable to the manufacture of a wide range of substituted pyridines.

The invention is illustrated but not limited by the following example.

EXAMPLE

The process was carried out in a glass reactor fitted with a reflux condenser and with a hollow-shafted cruciform stirrer. Oxygen was introduced through the stirrer and subsequently withdrawn from the reactor and recycled, at the rate of 10 litres per hour.

2-methoxy-3,4-dihydro-2H-pyran (0.12 mole) was added with stirring to a solution of ammonium acetate (0.23 mole) in 200 ml. aqueous acetic acid (containing 50% by weight of acetic acid) at 80° C. Oxygen was introduced continuously and the reaction mixture was maintained at 80° C. for 4 hours.

The molar yield of pyridine, based on the pyran fed, was 15%.

What is claimed is:
1. A process for the manufacture of a pyridine which consists essentially of reacting a compound of the group consisting of glutaraldehyde, lower alkyl glutaraldehydes and 2-alkoxy-3,4-dihydro-2H-pyrans having up to 6 carbon atoms in the alkoxy group in the liquid phase with ammonium ions in the presence of molecular oxygen and in the absence of any catalyst.

2. The process of claim 1 wherein said reaction is carried out at a pH in the range 1 to 7, the concentration of ammonium ions is at least 0.01 molar, the reaction temperature is in the range 15° C. to 150° C., and the pressure is in the range 1 to 30 atmospheres.

3. The process of claim 2 wherein the oxygen partial pressure is at least 0.5 atmosphere.

4. The process of claim 2 wherein the reaction medium comprises an alkanoic acid containing up to 6 carbon atoms in the alkyl group.

5. The process of claim 4 wherein the reaction medium is aqueous acetic acid.

References Cited

UNITED STATES PATENTS 3,306,905  2/1967  Hall et al. _____ 260—290

HENRY R. JILES, Primary Examiner

C. M. SHURKO, Assistant Examiner

U.S. Cl. X.R.

260—601